2,989,542
PRODUCTION OF PROTO-ANEMONIN AND ITS HOMOLOGUES

Franz Reicheneder, Hubert Suter, and Karl Dury, all of Ludwigshafen (Rhine), Germany, assignors to Badische Anilin- & Soda-Fabrik Aktiengesellschaft, Ludwigshafen (Rhine), Germany
No Drawing. Filed Dec. 12, 1958, Ser. No. 779,811
Claims priority, application Germany Dec. 14, 1957
15 Claims. (Cl. 260—343.6)

It is already known that proto-anemonin is obtained according to Ch. Grundmann and E. Kober, J. Am. Chem. Soc. 77, page 2332 to 2333 (1955), by converting levulinic acid, after ring closure to angelica lactone, into dibromo valerolactone and then splitting off two mols of hydrogen bromide by treatment with tertiary amines.

Furthermore it is already known that according to H. M. Walton, J. Org. Chem. 22, page 312 to 315 (1957), it is possible to prepare proto-anemonin homologues by a troublesome and multistage synthesis. Thus for example a diene, such as cyclopentadiene or anthracene is reacted with methyl maleate half chloride in a diene synthesis into the corresponding diene adduct. This adduct is converted by means of the Grignard reaction into a derivative of gamma-ketocarboxylic acid ester, then the ester derivative is saponified and then the free acid condensed to the lactone compound in acetic anhydride in the presence of sodium acetate or hydrochloric acid. With the aid of a retro-diene splitting there are finally obtained the proto-anemonin homologue and the diene used.

In all these known methods however it is a question of scientific methods for the preparation of proto-anemonin or its homologues on a laboratory scale. A transfer of these methods to an industrial scale is not possible because by reason of the multistage operation, practicable yields could not be expected.

We have now found that proto-anemonin and its homologues are obtained in a very simple way by leading gamma-keto-carboxylic acids, their esters or other derivatives at elevated temperature either simultaneously or consecutively over dehydrogenation and dehydration catalysts.

By the process according to this invention there is now open a simple way, which is practicable industrially, for the production of proto-anemonin or its homologues from gamma-keton-carboxylic acids or their esters or derivatives, i.e. gamma-keto carboxylic acid amides. Either gamma-keto-carboxylic acids or their esters or derivatives are converted in the direct way by dehydrogenation and dehydration into the proto-anemonin or its homologues, or the gamma-keto-carboxylic acids or their esters or derivatives are first dehydrogenated and the resultant dehydrogenation products dehydrated or, conversely, the gamma-keto-carboxylic acids or their esters or derivatives are first dehydrated and the dehydration products obtained then dehydrogenated.

The three different ways of proceeding may be illustrated by formulae by way of examples, and indeed in the case of propionyl-propionic acid, as follows:

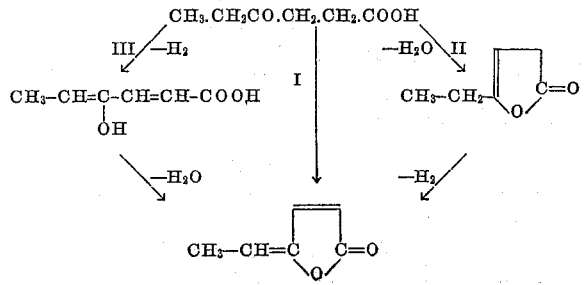

In the method given under II, lactones are obtained in the first stage by dehydration. Although not indicated in the above scheme, obviously the dehydration product can contain all three isomeric lactones, i.e. hexene-(2)-olide-(1.4), hexene-(3)-olide-(1.4) and hexene-(4)-olide-(1.4), side by side in varying proportions. When carrying out the process according to methods II and III, the intermediate products obtained in the first stage may be isolated, but the reaction mixture obtained can be further worked up directly. It is obviously also possible to use as initial materials for the process lactones of gamma-keto-carboxylic acids obtained in other ways and to convert them into proto-anemonin or its homologues by dehydrogenation according to the present invention.

When carrying out the process by the method indicated by I in the formula scheme, the initial materials used are gamma-keto-carboxylic acids, for example with 5 to 8 carbon atoms, or their esters or other derivatives, as for example levulinic acid, methyl or ethyl levulinate, propionyl-propionic acid, or methyl or ethyl propionyl-propionate. Derivatives are the corresponding acid amides. As esters are used the acid esters of the lower alcohols, i.e. with one to six carbon atoms, especially the esters of methyl-, ethyl-, propyl-, and butylalcohol.

The same initial materials are used when carrying out the reaction by methods II and III of the formula scheme, or, when using method II, as already described, the compounds obtained by lactonisation of the said gamma-keto-carboxylic acids or their esters or derivatives, as for example 1.4-pentenolides, or 1.4-hexennoldes, i.e. for example pentene-(3)-olide-(1.4) (alpha-angelica lactone), pentene-(2)-olide-(1.4) (beta-angelica lactone), pentene-(4)-olide-(1.4), hexene-(3)-olide-(1.4), hexene-(2)-olide-(1.4), hexane-(4)-olide-(1.4) or mixtures of the same.

In carrying out the process by any of the said methods, the dehydrogenation and dehydration catalysts generally known in industry are used consecutively or simultaneously.

As catalysts which may be used for the dehydrogenation and dehydration of gamma-keto-carboxylic acids or their esters or derivatives simultaneously there may serve, besides the known metallic dehydrogenation catalysts, as for example the platinum metals, such as palladium, platinum and other metals like copper and nickel, above all phosphate catalysts which are used in admixture with alkali or alkaline earth oxides or applied to carriers, such as aluminum oxide and the like in proportions between 0.5 and 40% by weight.

Among the possible catalyst compositions there have proved to be especially preferably silica or aluminum oxide catalysts which contain about 20% of phosphoric acid, calcium nickel phosphate catalysts, a catalyst of gamma-aluminum oxide on which 10% of palladium has been applied, an active carbon catalyst on which 20% of palladium has been applied, and furthermore 20% of nickel and 1% of chromium on silica gel; 5% of copper, 15% of nickel and 1% of chromium on silica gel; 5% of copper, 16% of nickel and 0.8% of manganese on silica gel, and also a catalyst which contains 98% of copper and small admixtures of barium, chromium and zinc.

These catalysts are however also suitable for example for the dehydrogenation of the three isomeric pentenolides-(1.4) and hexenolides-(1.4) in the gas phase.

As special catalysts for the dehydrogenation of the dehydration products according to method II of the above formula scheme, there may be used the dehydrogenation catalysts generally known in the industry.

Thus there may be used for example the metals palladium, platinum, nickel, or copper in metallic form on inert carriers, as for example aluminum oxide, silica gel, pumice, carbon or fuller's earth. The proportion by weight of the metal applied to the carrier may vary between 0.5 and 40%; a weight proportion of 10 to 30% with reference to the total amount of catalyst has proved especially favorable.

When using metallic dehydrogenation catalysts, especially those which are applied to carriers, it is favorable previously to activate the catalysts preferably under the prevailing reaction conditions by treatment in a current of hydrogen.

The oxides of groups VA and VIA of the periodic system, and also mixed catalysts which consist for example to a predominant extent of zinc oxide and small amounts of nonvolatile alkali or alkaline earth salts of inorganic acids and/or alkali or alkaline earth oxides or hydroxides, are however also suitable for the dehydrogenation. The oxides of the metals of groups VA and VIA, for example of vanadium, chromium, molybdenum, tungsten and uranium, may however also have added to the other oxides, as for example zinc oxide, aluminum oxide, especially the modification known as gamma-aluminum oxide, magnesium oxide, bismuth oxide and thorium oxide.

The dehydrogenation of the dehydration products obtained according to method II above, i.e. the dehydrogenation of the lactones, can however also be carried out in the liquid phase. Raney catalysts such as Raney nickel, Raney cobalt and Raney copper are, inter alia, suitable as catalysts for this purpose. It is advantageous when working in this way however to use as dehydrogenation catalysts the quinones or quinone derivatives, as for example ortho-chloranil, para-chloranil, 2.3-dichlor-5.6-dicyano-1.4-benzoquinone.

In the carrying out of the process, the catalysts may be rigidly arranged in the reaction vessels or may be moved through the reaction vessel by a fluidisation method. It is also possible however to keep the catalysts, which are in granulated, powdered or pilled form, in fluidised motion.

The process is carried out at elevated temperature. When working in the gas phase, it is preferable to select a temperature range of 250° to 600° C., advantageously between 350° and 500° C. On the contrary when working in the liquid phase, it is preferable to operate in the temperature range of 70° to 180° C., advantageously between 100° and 150° C.

The process may be carried out under reduced, normal or increased pressure. When carrying out the dehydrogenation in the gas phase it is advantageous to work under reduced pressure, for example at 30 to 500 mm. Hg, especially between 100 and 300 mm. Hg. It is also possible to dehydrogenate at normal or increased pressure however. When carrying out the dehydrogenation in the gas phase, the initial materials may be introduced directly into the catalyst zone or a suitable vaporiser may be interposed in which the initial materials are indirectly heated and vaporised, whereupon they are introduced in vapor form, if desired together with inert gases, into the catalyst zone. The co-employment of inert gases is suitable for example in carrying out either of the two catalytic process stages according to reaction methods II or III in a fluidized layer because the vapors of the substance to be dehydrogenated or dehydrated are usually insufficient to keep the catalyst in the necessary turbulent motion. The inert gases used to support the fluidization may be led in circulation. Especially in the dehydrogenation, it may be preferable not to allow the dehydrogenation to proceed to completion by a single passage of the substance through the reaction vessel, but to carry the dehydrogenation only up to a definite partial conversion. In this case the residence period of the substance at the catalyst is reduced by known technical measures, as for example making the catalyst zone or the path therethrough shorter. The conversion may also be diminished by dilution of the substances to be reacted. Thus for example in dehydrogenation in the gas phase, inert gases may be admixed, or in dehydrogenation in the liquid phase, solvent may be added.

As inert gas there may be used water vapor, i.e. 5 to 75% by weight of the initial material.

As solvents there are suitable for example: hydrocarbons such as xylene, alcohols such as tertiary butanol, ethers such as dioxane, chlorohydrocarbons such as tetrachlorethylene.

By the process according to this invention it is possible to prepare proto-anemonin and its homologues, for example methyl proto-anemonin or ethyl proto-anemonin, in continuous fashion. However it is also possible, when it is preferred, to work according to the methods indicated in the formula scheme partly continuously and partly discontinuously. Thus for example in the direct production of methyl proto-anemonin from propionyl-propionic acid, the latter is introduced in admixture with 5 to 10% of water vapor, continuously in vapor form, if desired in the presence of inert gas, into the reaction vessel and led over the catalyst. The mixture being supplied may however also be dripped into the reaction vessel which is heated externally to above the boiling temperature. When introducing the initial material directly into the reaction vessel heated above the boiling temperature, an inert organic solvent, as for example a hydrocarbon, such as benzene, petroleum ether, or an alcohol, may be additionally introduced into the reaction chamber. By inert solvents we understand mainly those which cannot initiate any side reactions under the reaction conditions, i.e. are not dehydrogenated or dehydrated themselves and do not react with the initial materials.

After the end of the reaction, the reaction mixture is preferably cooled or quenched. It is advantageous to carry out the cooling of the reaction mixture by a cold aqueous stabiliser solution which contains, for example, hydroquinone, pyrogallol, phenthiazine, ascorbic acid or a mixture of these substances, i.e. in amounts of 0.1 to 5.0% preferably 0.5%. A special embodiment consists for example in atomising the hot reaction gas directly into a cold aqueous solution of the said stabilisers, the proto-anemonin or its homologues thereby being separated from the reaction gas and at the same time stabilized. The reaction gases may however be quenched by water and the stabilizers added subsequently, or the cooling and condensation may be carried out by other methods.

The reaction mixture is worked up for example by fractional distillation. The crude products are preferably distilled under reduced pressure.

The substances accessible according to this invention are valuable antibiotics.

The following examples will further illustrate this invention but the invention is not restricted to these examples.

*Example 1*

200 ccs. of a catalyst which contains 20% of copper and 0.7% of chromium on silicon dioxide as a carrier are rigidly arranged in a vertical tube which is 60 cm. long and 45 mm. in diameter. Through this tube there are led in the course of 8 hours at 350° C. and 760 mm. Hg pressure 112 grams of hexene-(3)-olide-(1.4). The gas mixture is collected in a separator and cooling system at the lower end of the reaction tube. By fractional distillation of the crude dehydrogenation product there are obtained at a boiling point of 86° to 92° C. at 22 mm. Hg, 79 grams of unreacted initial material which can be used again and at a boiling point of 115° to 120° C. at 25 mm. Hg, 28 grams of methyl proto-anemonin. A small amount of residue remains in the vessel. The yield of methyl proto-anemonin corresponds to 86% of the theory with a conversion of 29.5% with reference to reacted hexene-(3)-olide-(1.4).

*Example 2*

In the same apparatus as in Example 1, 112 grams of hexene-(4)-olide-(1.4) are reacted in the course of 7 hours at 400° to 410° C. and 50 mm. Hg pressure over a catalyst which contains 10% of palladium on aluminum oxide as carrier. The product is distilled. 65 grams of hexene-(4)-olide-(1.4) are obtained and then 41 grams of methyl proto-anemonin at the boiling point 100° to 105° C. at 21 mm. Hg. With a conversion of 42%, the yield amounts to more than 89% of the theory.

Example 3

112 grams of hexene-(2)-olide-(1.4) are led as described in Example 1 at 390° C. and 300 mm. Hg pressure in the course of 6 hours over a palladium carbon dehydrogenation catalyst which contains 20% of palladium. 39 grams of methyl proto-anemonin and 61.5 grams of hexene-(2)-olide-(1.4) are obtained at the boiling point 120° to 125° C. at 25 mm. Hg. The yield is 79% with a conversion of about 45%.

Example 4

In the manner described in Example 1, 112 grams of hexene-(2)-olide-(1.4) are led in the course of 7 hours at 350° C. and 760 mm. Hg pressure over a catalyst which contains 1.5% of palladium on aluminum oxide as carrier, 15 grams of methyl proto-anemonin are obtained, besides 90 grams of initial material. The yield is 68% and the conversion 19.5%.

Example 5

In the manner described in Example 1, 112 grams of hexene-(2)-olide-(1.4) are led in the course of 7 hours at 350° C. and 760 mm. Hg pressure over a catalyst which contains 20% of copper and 0.7% of chromium on silicon dioxide as carrier. 23 grams of methyl proto-anemonin and 79.4 grams of initial material are obtained. The yield amounts to 70.6% and the conversion 29%.

Example 6

112 grams of hexene-(2)-olide-(1.4) are led, as described in Example 1, over a catalyst which contains 20% of nickel and calcium phosphate in the course of 6½ hours at 350° C. and 400 mm. Hg pressure. 17 grams of methyl proto-anemonin and 92 grams of unreacted initial material are obtained. The yield amounts to 85% and the conversion to 17.5%.

Example 7

112 grams of hexene-(4)-olide-(1.4) are led, as described in Example 1, over a catalyst which contains 5% of copper, 15% of nickel and 1% of chromium on silicon dioxide as carrier in the course of 6 hours at 350° C. and 250 mm. Hg pressure. 12 grams of methyl proto-anemonin are obtained besides 96.6 grams of initial material. This corresponds to a yield of 74% and a conversion of 14.5%.

Example 8

In the manner described in Example 1, 112 grams of hexene-(3)-olide-(1.4) are led in the course of 8 hours at 300° C. and 760 mm. Hg pressure over a catalyst which contains 5% of copper, 16% of nickel and 0.8% of manganese on silicon dioxide as carrier. 19 grams of methyl proto-anemonin and 88 grams of unreacted initial material are obtained. This corresponds to a yield of 79% of the theory at a conversion of 21%.

Example 9

98 grams of pentene-(2)-olide-(1.4) are led, in the apparatus described in Example 1, in the course of 6 hours at 370° C. and 400 mm. Hg pressure over a catalyst which contains 10% of palladium on aluminum oxide as catalyst.

In the working up, the solid product is separated and recrystallised. There are thereby obtained 28 grams of anemonin of the melting point 150° C. The liquid phase is fractionally distilled, another 12 grams of proto-anemonin pass over at 85° C. and 15 mm. Hg. At 89° to 90° C. at 15 mm. Hg there are obtained 49 grams of unreacted initial material. This corresponds to a yield of dehydrogenation product of 81.5% of which 24.5% are proto-anemonin and 57% anemonin. The conversion is about 50%.

Example 10

In the manner described in Example 1, 98 grams of pentene-(3)-olide-(1.4) are led in 7 hours at 450° C. and 50 mm. Hg pressure over a catalyst which contains 20% of palladium on granular carbon. The product is worked up as described in Example 9 and there are obtained 24 grams of anemonin of the melting point 151° C., 44 grams of unreacted initial material at the boiling point 55° to 56° C. at 12 mm. Hg and 18 grams of proto-anemonin at the boiling point 80° C. at 12 mm. Hg. The yield of dehydrogenation product amounts to about 78% of which 33.4% are proto-anemonin and 44.5% anemonin. The conversion is 56%.

Example 11

From 98 grams of pentene-(3)-olide-(1.4) there are obtained in the same way over a catalyst of 20% of copper and 0.7% of chromium on silicon dioxide, 32 grams of anemonium and 6 grams of proto-anemonin as well as 36 grams of unreacted initial material. The yield of dehydrogenation product is 73% of which 11.3% are proto-anemonin and 61.6% anemonin. The conversion is 53%.

Example 12

112 grams of hexene-(3)-olide-(1.4) and 245 grams chloranil in 400 ccs. of xylene are boiled under reflux for 1 hour while stirring. When the reaction has ended, the precipitate is filtered off and the solvent distilled off. The residue is fractionally distilled. At a boiling point of 37° to 40° C. at 0.03 mm. Hg there are obtained 70 grams of pure methyl proto-anemonin, $n_D^{20}=1.5319$. The yield is 63.5% of the theory with reference to hexene-(3)-olide-(1.4).

Example 13

112 grams of hexene-(2)-olide-(1.4) and 245 grams of chloranil in 400 ccs. of xylene are boiled under reflux for half an hour while stirring. Working up is carried out as in Example 12. Besides 51 grams of unreacted initial material, 42 grams of methyl proto-anemonin are obtained. The conversion corresponds to 54.5% and the yield to 69%.

Example 14

400 ccs. of a catalyst containing nickel and calcium phosphate are rigidly arranged in a vertical tube 1 meter in length and 45 millimeters in diameter. Through this tube there are led per hour 50 ccs. of a mixture of 95% of propionyl-propionic acid and 5% of water. The reaction temperature is 470° C. and the pressure 200 mm. Hg. At the lower end of the reaction tube, the gas mixture is collected in a separating and cooling system. 28 grams of methyl proto-anemonin (boiling point 115° to 120° C. at 25 mm. Hg) are obtained per hour, besides 15.5 grams of unreacted propionyl-propionic acid (boiling point 125° to 130° C. at 25 mm. Hg), which are separated by fractional distillation. The conversion amounts to 65%, and the yield to 90.5%. The space time yield is 1.5 to 2 kilograms per liter per day.

Example 15

By working in the way described in Example 14 with a catalyst which contains 20% of phosphoric acid on aluminum oxide as carrier, there are obtained per hour 15 grams of methyl proto-anemonin (boiling point 115° to 120° C. at 25 mm. Hg), 9 grams of hexene-(2)-olide-(1.4) (boiling point 120° to 125° C. at 25 mm. Hg) and 17.5 grams of unreacted propionyl-propionic acid (boiling point 125° to 130° C. at 25 mm. Hg). The reaction amounts to 61%; the yield of methyl proto-anemonin is 52.5% and that of hexene-(2)-olide-(1.4) is 30%, a total yield of 82.5%.

Example 16

200 ccs. of a catalyst which contains 10% of palladium on aluminum oxide as carrier are rigidly arranged in a vertical tube 60 centimeters long and 45 millimeters in diameter. Through this tube there are led in the course of 6 hours at 400° to 410° C. and 150 mm. Hg pressure, 158 grams of propionyl-propionic acid ethyl ester. By working up there are obtained by fractional distillation 10 grams of methyl proto-anemonin, 24 grams of hexene-(2)-olide-(1.4) and 78.5 grams of propionyl-propionic acid.

Instead of ethyl propionyl-propionate, there may also be reacted 144 grams of ethyl levulinate. By working up, there are obtained by fractional distillation at 15 mm. Hg after separating 20 grams of anemonin; at the boiling point 85° C., 5 grams of proto-anemonin, at the boiling point 85° to 95° C., 13 grams of pentene-(2)-olide-(1.4) and at the boiling point 150° to 160° C., 65 grams of levulinic acid.

Example 17

116 grams of levulinic acid are led at 470° C. and 250 mm. Hg pressure in the course of 6 hours over the catalyst under the experimental conditions of Example 16 while using a calcium nickel phosphate catalyst. A cold aqueous 2% solution of hydroquinone is sprayed into the reaction tube immediately below the reaction zone. The reaction gases are quenched and separated in a separating system. A stabilization of the quite unstable proto-anemonin is thereby achieved so that the dimerisation is suppressed to the maximum extent. After separating the crystal fraction of 8 parts of anemonin (11% of the theory), there are obtained by fractional distillation 49 parts of proto-anemonin (67% of the theory) at the boiling point 85° C. at 15 mm. Hg and 43 parts of unreacted levulinic acid at the boiling point 154° to 160° C. at 15 mm. Hg. The conversion amounts to 63%.

By using a catalyst which contains 20% of phosphoric acid on silicon dioxide, there are obtained 4 grams of anemonin, 43 grams of proto-anemonin and 11 grams of pentene-(2)-olide-(1.4).

We claim:

1. A process for the production of proto-anemonin and its homologues which comprises treating a compound selected from the group consisting of the unsubstituted gamma-ketocarboxylic acids having 5 to 8 carbon atoms and their esters with lower alkanols containing 1 to 6 carbon atoms at elevated temperature in the presence of dehydration and dehydrogenation catalysts.

2. The process as claimed in claim 1 wherein the dehydrating and the dehydrogenating treatment is carried out simultaneously.

3. A process for the production of proto-anemonin and its homologues which comprises vaporising a compound selected from the group consisting of the unsubstituted pentenolides-(1.4) and hexenolides-(1.4) and treating the vapors at a temperature of from 250 to about 600° C. in the presence of a dehydrogenation catalyst.

4. The process as claimed in claim 3 wherein the dehydrogenation is carried out in the presence of water-vapor.

5. The process as claimed in claim 3 wherein the dehydrogenation is carried out under a reduced pressure at 30 to 500 mm. Hg.

6. A process for the production of proto-anemonin and its homologues which comprises treating a compound selected from the group consisting of the unsubstituted pentenolides-(1.4) and hexenolides-(1.4) in the liquid phase diluted with an inert solvent at a temperature of 70 to 180° C. in the presence of a Raney catalyst.

7. A process for the production of proto-anemonin which comprises treating levulinic acid at temperatures of from 250 to about 600° C. and under reduced pressure at 30 to 500 mm. Hg in the presence of a catalyst containing 0.5 to 40 parts by weight of nickel and calcium phosphate.

8. The process as claimed in claim 7 wherein the treatment is carried out in the presence of water-vapor.

9. A process for the production of methyl proto-anemonin which comprises treating β-propionyl-propionic acid at temperatures of from 250 to about 600° C. and under reduced pressure at 30 to 500 mm. Hg in the presence of a catalyst containing 0.5 to 40 parts by weight of nickel and calcium phosphate.

10. The process as claimed in claim 9 wherein the treatment is carried out in the presence of water-vapor.

11. A process for the production of methyl proto-anemonin which comprises treating the β-propionyl-propionic acid ester of lower alkanols containing 1 to 6 carbon atoms at a temperature of from 250 to about 600° C. under reduced pressure at 30 to 500 mm. Hg in the presence of a catalyst containing up to 10% palladium on aluminum oxide as a carrier.

12. The process as claimed in claim 11 wherein the treatment is carried out in the presence of water-vapor.

13. The process as claimed in claim 1 wherein the dehydrating and dehydrogenating treatments are carried out in separate stages.

14. The process as claimed in claim 13 wherein the dehydration is carried out in a first stage and the resulting product is dehydrogenated in a second stage in the gaseous state at a temperature of from 250° C. to about 600° C. in the presence of a dehydrogenation catalyst.

15. The process as claimed in claim 13 wherein the dehydration is carried out in a first stage and the resulting product is dehydrogenated in a second stage in the liquid state at a temperature of from 70° C. to 180° C. in the presence of a dehydrogenation catalyst.

References Cited in the file of this patent

Asuhina et al.: Chem. Zentral. III, p. 712 (1922).
Shaw: J. Am. Chem. Soc., vol. 68, pp. 2510–3 (1946).
Haynes et al.: Quarterly Reviews, vol. II, pp. 50 and 51 (1948).